UNITED STATES PATENT OFFICE.

THOMAS J. MAYALL, OF READING, MASSACHUSETTS.

HARD-RUBBER COMPOUND CALLED "ARTIFICIAL HORN."

SPECIFICATION forming part of Letters Patent No. 247,840, dated October 4, 1881.

Application filed May 7, 1881. (No specimens.)

*To all whom it may concern:*

Be it known that I, THOMAS J. MAYALL, of Reading, in the county of Middlesex and Commonwealth of Massachusetts, have invented a new and useful Improvement in Hard-Rubber Compounds, which I call "Artificial Horn," of which the following is a specification.

The object of my invention is to produce a strong, durable, and beautiful material, of and from which door-handles, tool-handles, handles and ornaments for furniture and cabinet-work, picture-frames, all kinds of ornamental objects, vases, and many other articles for use or ornament may be made at a comparatively moderate cost; and it consists in thoroughly combining and curing and hardening by heat of pure rubber, one pound; sulphide or sulphuret of antimony, three-quarters to one and one-quarter pound; and graphite, one-half a pound to one pound. These materials I thoroughly commingle and blend together in a plastic mass, and then I cure or harden it by heat, either in the mass or molded to the form or forms of the objects to be made of it.

The process of curing and hardening this compound is the same as the well-known process of curing and hardening rubber and sulphur compounds, to produce what is termed "hard rubber" in all respects, except that I gradually increase the temperature of the oven or steam-chamber in which it is heated. I begin and continue the heat for about one hour at about 235° Fahrenheit, and one hour at about 245°, one hour at about 255°, one hour at about 265°, one hour at about 275°, and one hour at about 300°, when it is sufficiently cured.

The product is sufficiently like horn in appearance to suggest the name I have given it, and useful and desirable for the purposes mentioned, and for many other uses.

I can and do vary the colors by the use of the several different colors of sulphide or sulphuret of antimony now produced.

The objects made from this product will generally be finished and polished after hardening if they are cured and hardened in or near the form they are to take when finished.

If the compound is cured and hardened in a mass objects to be made from it will be sawed, turned, cut, and carved as the case may require into the form desired, and then finished and polished.

I claim as new and my invention—

1. The above-described artificial horn, consisting of rubber, sulphide or sulphuret of antimony, and graphite commingled together and cured and hardened, all substantially as described, and for the purposes specified.

2. As new articles of manufacture, handles and other objects made of or from the above-described artificial horn.

THOS. J. MAYALL.

Witnesses:
CHS. HOUGHTON,
H. KENNEY, Jr.